US008573902B2

(12) United States Patent
Kaufmann

(10) Patent No.: US 8,573,902 B2
(45) Date of Patent: Nov. 5, 2013

(54) GROOVING TOOL FOR CUTTING GROOVES IN WORKPIECES AND A GROOVING TOOL TOOL HOLDER FOR PERMITTING REPLACEMENT OF INSERTS AND PERMITTING INSERTS TO BE REPLACED WITHOUT MOVING THE TOOL HOLDER WITH RESPECT TO THE GROOVING TOOL IN WHICH THE TOOL HOLDER IS INSTALLED

(75) Inventor: Igor Kaufmann, Nürnberg (DE)

(73) Assignee: Keenametal Inc., Latrobe, PA (US)

( * ) Notice: Subject to any disclaimer, the term of this patent is extended or adjusted under 35 U.S.C. 154(b) by 1127 days.

(21) Appl. No.: 12/487,385

(22) Filed: Jun. 18, 2009

(65) Prior Publication Data

US 2010/0158622 A1    Jun. 24, 2010

Related U.S. Application Data

(63) Continuation-in-part of application No. PCT/EP2007/008794, filed on Oct. 10, 2007.

(30) Foreign Application Priority Data

Dec. 18, 2006 (DE) .................. 10 2006 059 717

(51) Int. Cl.
*B23B 27/16* (2006.01)
(52) U.S. Cl.
USPC .................. 407/110; 407/107; 407/117

(58) Field of Classification Search
USPC .......... 407/107, 108, 109, 110, 111, 117, 113
IPC .............................................. B23B 27/04, 27/16
See application file for complete search history.

(56) References Cited

U.S. PATENT DOCUMENTS

| 5,112,164 | A  | * | 5/1992  | Pano ............................ 407/110 |
| 6,186,704 | B1 | * | 2/2001  | Hale ............................ 407/101 |
| 6,814,526 | B2 | * | 11/2004 | Shiraiwa et al. ............. 407/110 |
| 6,974,283 | B2 | * | 12/2005 | Oettle .......................... 407/107 |
| 7,264,424 | B2 | * | 9/2007  | Hansson et al. ............. 407/109 |
| 7,329,072 | B2 | * | 2/2008  | Nagaya et al. ............... 407/109 |
| 7,758,286 | B2 | * | 7/2010  | Nagaya et al. ............... 407/101 |

(Continued)

FOREIGN PATENT DOCUMENTS

| CH | 664102 A5 | 2/1988 |
| CN | 1575893 A | 2/2005 |

(Continued)

OTHER PUBLICATIONS

State Intellectual Property Office of the People'S Republic of China, English Language Translation of "Rejection Decision (PCT Application in the National Phase)", 10-26-201, 13 pp.

(Continued)

*Primary Examiner* — Daniel Howell
*Assistant Examiner* — Nicole N Ramos
(74) *Attorney, Agent, or Firm* — Larry R. Meenan, Esq.

(57) ABSTRACT

A grooving tool for cutting grooves in workpieces and a grooving tool tool holder for permitting replacement of inserts and permitting inserts to be replaced without moving the tool holder with respect to the grooving tool in which the tool holder is installed.

12 Claims, 6 Drawing Sheets

(56) References Cited

U.S. PATENT DOCUMENTS

| | | | |
|---|---|---|---|
| 7,780,380 B2 * | 8/2010 | Nagaya et al. | 407/101 |
| 2004/0151551 A1 | 8/2004 | Oettle | |
| 2005/0019112 A1 | 1/2005 | Erickson et al. | |
| 2005/0207853 A1 * | 9/2005 | Hansson et al. | 407/109 |
| 2006/0159527 A1 * | 7/2006 | Nagaya et al. | 407/117 |

FOREIGN PATENT DOCUMENTS

| | | |
|---|---|---|
| DE | 27 55 003 | 6/1978 |
| DE | 88 04 365 | 5/1988 |
| DE | 3810032 A1 | 10/1988 |
| DE | 4033072 A1 * | 4/1992 |
| DE | 101 32 721 | 1/2003 |
| EP | 1 252 954 | 10/2002 |
| EP | 1262262 A1 * | 12/2002 |
| EP | 1 533 056 | 5/2005 |
| FR | 2 373 349 | 7/1978 |
| FR | 2598106 A1 * | 11/1987 |
| JP | 60-120701 | 8/1985 |
| JP | 10-156604 | 6/1998 |
| WO | 2005035182 A1 | 4/2005 |

OTHER PUBLICATIONS

State Intellectual Property Office of the People'S Replubic of China, "Third Office Action", Chinese Action and English Translation thereof, dated Apr. 20, 2011, 12 pp.

Patent Office of the Russian Federation, "Official Action", Russian Action and English Translation thereof, dated Mar. 23, 2011, 3 pp.

Ordinartsev I.A., L., "Mashinostroyeniye", "Reference Book for Tool Maker", 1987, p. 268, /3/-2 p.

International Search Report PCT/EP2007/008794 and English translation thereof.

Nakajima, Jun, Notice of Reasons for Rejection, Jun. 26, 2012, Dispatch No. 431602, original and translation, 7 pgs.

\* cited by examiner

GROOVING TOOL FOR CUTTING GROOVES IN WORKPIECES AND A GROOVING TOOL TOOL HOLDER FOR PERMITTING REPLACEMENT OF INSERTS AND PERMITTING INSERTS TO BE REPLACED WITHOUT MOVING THE TOOL HOLDER WITH RESPECT TO THE GROOVING TOOL IN WHICH THE TOOL HOLDER IS INSTALLED

CONTINUING APPLICATION DATA

This application is a Continuation-In-Part application of International Patent Application No. PCT/EP2007/008794, filed on Oct. 10, 2007, which claims priority from Federal Republic of Germany Patent Application No. 10 2006 059 717.6, filed on Dec. 18, 2006. International Patent Application No. PCT/EP2007/008794 was pending as of the filing date of this application. The United States was an elected state in International Patent Application No. PCT/EP2007/008794.

BACKGROUND

1. Technical Field

The present application relates to a grooving tool for cutting grooves in workpieces and a grooving tool tool holder for permitting replacement of inserts and permitting inserts to be replaced without moving the tool holder with respect to the grooving tool in which the tool holder is installed.

2. Background Information

Background information is for informational purposes only and does not necessarily admit that subsequently mentioned information and publications are prior art.

The present application relates to a tool holder, in one possible embodiment for a grooving tool, having a parent body which extends along a holder longitudinal axis and which has at the front end a clamping head for accommodating a cutting body, wherein the clamping head has a cutting body receptacle defined by a clamping claw and a bottom bearing surface, and the clamping claw can be tightened in the direction of the bottom bearing surface by means of a tightening element. The present application also relates to a cutting body for such a tool holder.

Some tool holders are used for example for grooving and longitudinal turning and for cutting-off operations on a rotating workpiece. The workpiece to be machined normally passes through a plurality of machining stages. In each machining stage, the workpiece is machined with a different tool. To this end, a plurality of tool holders, also different tool holders, which are fitted with different tools, are arranged in a row in a machine mounting, for example a cassette. The workpiece, which rotates during the machining, is then brought alternately into contact with the different tools for the machining.

On account of the machining, the cutting bodies are subjected to wear and therefore have to be exchanged from time to time. In order to keep the downtimes as short as possible during the workpiece machining, as simple an exchange of the individual tools as possible is desired. At the same time, the individual tools, for example cutting bodies, must or should be held reliably and free of play in an exact or general and defined position in the tool holder in order to make possible the desired, high-precision machining.

OBJECT OR OBJECTS

An object of the present application is to make possible a simple exchange of a cutting body. Another object of the present application is also to specify a cutting body suitable for this purpose.

SUMMARY

This object is achieved according to the present application by a tool holder. The tool holder has a normally parallelepiped-shaped parent body which extends along a holder longitudinal axis in the x direction. The parent body has a width extending in the y direction and a height extending in the z direction. At its front end, the tool holder comprises a clamping head for accommodating a cutting body. The clamping head has a cutting body receptacle which is defined at the top by a clamping claw and at the bottom by a bottom bearing surface. A cutting body is clamped in place between the clamping claw and the bearing surface. To this end, a separating slot running between the clamping claw and the bearing surface is provided, such that the clamping claw is held elastically on the parent body. For tightening the cutting body in the cutting body receptacle, a tightening element is provided, by means of which the clamping claw can be tightened on the bottom bearing surface. The tightening element extends over the separating slot and is held in an abutment in the parent body, such that, when the tightening element is being tightened, the clamping claw presses directly against the bearing surface. In order to now make possible simple and problem-free accessibility for the exchange of the cutting body, a center axis of the tightening element encloses a tightening angle less than forty-five degrees and in one possible embodiment less than thirty degrees relative to the holder longitudinal axis. The center axis of the tightening element is therefore inclined by the tightening angle within the x-z plane relative to the holder longitudinal axis and thus relative to the x direction, such that, overall, the head surface of a head of the tightening element is oriented very steeply and thus in a readily accessible manner relative to the holder longitudinal axis. Due to the very good accessibility at the front end, an exchange of the cutting body is possible without any problems, even if the tool holder is clamped in place together with a plurality of further tool holders and in a narrow space in a machine mounting. Tests have shown that, on account of the small tightening angle, very good accessibility is provided for and at the same time—despite the small tightening angle—a sufficient clamping force in the normal direction, i.e. essentially in the z direction, can be achieved by means of the tightening element, such that secure and reliable seating of the cutting body in the cutting body receptacle is essentially ensured or promoted. In order to essentially ensure or promote a sufficient clamping force, the clamping angle is in one possible embodiment greater than ten degrees and in one possible embodiment greater than twenty degrees to twenty-five degrees.

According to one possible embodiment, the clamping claw has a countersunk receptacle for accommodating a head of the tightening element, the countersunk receptacle extending along a center line. This center line is arranged offset relative to the centre axis of the tightening element, to be precise or general offset upward. That is to say, the center axis and the center line have an offset within the x-z plane. Due to this measure, an additional force component is exerted in the clamping direction, i.e. essentially in the z direction, when the tightening element is being tightened. The clamping force is thereby increased. Here, the offset is in one possible embodiment within the range of between 0.2 millimeter and 0.3 millimeter.

In order to permit simple production of the tool holder, an end face, running next to the cutting body receptacle, of the parent body is in one possible embodiment formed by at most two flat end faces sections. In an embodiment variant, the end face is formed by a single end face section which is oriented in one possible embodiment perpendicularly or virtually perpendicularly to the center axis of the tightening element.

If the end face is formed by two end face sections, the top end face section, which accommodates the head of the tightening element, is in one possible embodiment oriented perpendicularly or virtually perpendicular to the center axis of the tightening element. The second end face section adjoining at the bottom is in one possible embodiment oriented perpendicularly or virtually perpendicularly to the holder longitudinal axis. The orientation perpendicular or virtually perpendicular to the holder longitudinal axis provides for a large free space for the chip disposal. Yet even in the design of the end face having one inclined end face section, a sufficient free space for the workpiece to be machined is achieved on account of the comparatively steep orientation.

Due to the configuration of the end face sections as a flat surface free of curvature, the end face can be produced, during the production of the tool holder, by very simple machining operations, such as milling for example.

The separating slot which separates the clamping claw from the rest of the parent body except for a bending cross section is provided for tightening the clamping claw relative to the bearing surface. A single separating slot is in one possible embodiment provided. The at least one end face section extends free of edges in one possible embodiment up to this separating slot. This end face section can therefore be produced in one possible embodiment by a simple milling operation. On account of the small tightening angle, no curved surface is required or desired here in order to make possible a sufficient free space for the workpiece machining.

According to one possible embodiment, the separating slot ends within the clamping head, i.e. the bending cross section lies in the clamping head. The extent of the clamping head in the direction of the holder longitudinal axis is in this case determined by a head region which is raised relative to a top shank surface of the parent body. Since the tightening element used is normally a tightening screw and therefore a thread is required and/or desired in the parent body for applying the requisite or desired tightening force, said thread being arranged on that side of the separating slot which faces away from the clamping claw, this design makes possible as large a thread length as possible. Due to the arrangement of the separating slot in the clamping body region, there is therefore still a comparatively large thread length, such that as large a force transmission distance as possible is achieved. The thread therefore forms an abutment for the tightening element in the parent body.

The cutting head receptacle in one possible embodiment extends beyond the head region. This allows the formation of a head region which is as short as possible. This head region, which is as short as possible, is in one possible embodiment in a multiple arrangement of a plurality of tool holders, for example in a cassette in longitudinal turning automatic lathes. The tool holders are arranged therein next to one another, for example vertically one above the other. The tool holder described here is intended in one possible embodiment for accommodating an insert for forming a cutting-off tool. Such cutting-off tools, in the multiple arrangement of different tools, are normally those which have the greatest length, the "projecting length." Since the individual cutting edges of the tools have to be set to a common plane, the cutting-off tool is therefore the limiting factor. In this respect, in one possible embodiment of the present application, the head region of the tool holder can be kept as small as possible, such that the tool holder can be displaced as far to the rear as possible in the cassette.

In order to obtain as large a thread length as possible, the separating slot in one possible embodiment ends within the raised head region.

Furthermore, in order to make possible the compact configuration, provision is made for the separating slot to run in an S shape and for it to be oriented in its central section approximately perpendicularly to the center axis of the tightening element. In this case, provision is made in one possible embodiment for the central section to be arranged, with respect to the holder longitudinal axis, in the front region, that is to say approximately in or in front of the center of the clamping head. The separating slot is therefore arranged very close to the end face of the parent body, such that a long force transmission distance for the tightening element remains overall.

According to one possible embodiment, the cutting body receptacle extends along a longitudinal axis which is inclined by a secondary clearance angle relative to the holder longitudinal axis with respect to the x-z plane. That is to say, the longitudinal axis is arranged at a secondary clearance angle relative to the vertical plane extending in the direction of the holder longitudinal axis. Said secondary clearance angle is in one possible embodiment within a region of less than two degrees and in one possible embodiment within the range of one degree and one and one-half degrees. Since the side faces of the parallelepiped-shaped parent body run parallel or virtually parallel to the holder longitudinal axis, the cutting body receptacle is oriented at the secondary clearance angle relative to the one side face of the parent body. This side face normally also defines a zero position relative to the y position, which zero position can be predetermined exactly or generally via the machine control.

As viewed in the direction of the holder longitudinal axis, the cutting body receptacle comprises a rear stop surface, on which the cutting body is supported in the fitted position. This rear stop surface is in this case oriented at a perpendicular or virtually perpendicular angle to the holder longitudinal axis. This means that the stop surface is additionally inclined relative to the longitudinal axis of the cutting body receptacle by the magnitude of the secondary clearance angle. The stop surface is therefore slightly inclined overall and not at right angles to the longitudinal axis of the cutting body receptacle. Correspondingly thereto, a front end of the cutting body is likewise inclined relative to an insert body longitudinal axis by an angle corresponding to the magnitude of the secondary clearance angle, to be precise or general in such a way that the front end of the cutting body bears flat against the stop surface.

When the cutting body is inserted, a cutting corner of the cutting body is in alignment with this side face of the parent body. Due to this measure, the cutting corner is therefore in the zero position predetermined by the machine mounting, such that the activation is kept simple and no conversion is necessary and/or desired. This exact or general orientation of the cutting corner within the plane which forms the defined zero position is made possible in one possible embodiment by virtue of the fact that very high tolerance requirements are imposed on the parent body, in one possible embodiment its side dimensions, and are complied with.

In a development, in one possible embodiment in addition to the inclination by the secondary clearance angle with respect to the x-z plane, the cutting body receptacle is in one possible embodiment also arranged inclined by an inclination angle relative to the holder longitudinal axis with respect to the x-y plane. That is to say, the cutting body receptacle is inclined by the inclination angle relative to the horizontal plane. Said inclination angle is within the range of a few degrees, for example within the range of three degrees to ten degrees, in one possible embodiment within the region of about five degrees. Due to the inclination angle, the cutting body receptacle runs obliquely into the parent body, as a result of which the cutting body receptacle is arranged deeper within the parent body in the rear region. Finally, this measure assists the formation of as short a clamping head as possible, since the cutting body receptacle can extend beyond the clamping head without any problems.

Furthermore, the object is achieved according to the present application by a cutting body for such a tool holder described here. The cutting body extends along an insert longitudinal axis and has a plate-shaped cutting region having a cutting edge at the front end. In one possible embodiment, the cutting region widens in the direction of the insert longitudinal axis from a narrow side toward the cutting edge. The two opposite side faces of the plate-shaped cutting region therefore diverge in the direction of the cutting edge, such that the cutting region widens toward the cutting edge. As a result, an insert secondary clearance angle is formed directly at the cutting body itself. Said insert secondary clearance angle therefore acts in addition to the secondary clearance angle as formed by the inclined arrangement of the cutting body receptacle.

The cutting body is generally of rotationally symmetrical design about one hundred-eighty degrees relative to a center rotation axis. The cutting body is therefore designed as a two-sided indexable insert.

The indexable insert in this case in one possible embodiment comprises a thickened central region. A plate-shaped cutting region adjoins each side of the thickened central region. These two plate-shaped cutting regions are in this case arranged offset and approximately diagonally opposite one another. The outer sides of the plate-shaped cutting regions are in this case largely in alignment with an outer side of the central region.

In one possible embodiment of the present application, the cutting region has an outer cutting corner which is oriented in alignment, that is in line, with an outer edge of the central region. Therefore an outer side face of the cutting region adjoins the central region. At the front end of the cutting region, the cutting corner is formed at the top corner of the outer side face.

In one possible embodiment of the present application, different grooving widths are possible without any problems using the same cutting body receptacle of the tool holder. The grooving width is defined in this case by the length of the cutting edge starting from the cutting corner. On account of the thickened central region, it is possible here to set a variable grooving width at the cutting body. The grooving width in this case, starting from the cutting corner, can extend up to a maximum grooving width which corresponds to the thickness of the central region.

On the opposite side, an end wall acting like a step is in contrast formed in the transition region between the plate-shaped cutting region and the thickened central region. This end wall is in one possible embodiment arranged inclined relative to the insert longitudinal axis. The inclination angle is in this case selected in such a way that the end wall runs, in the fitted state, parallel or virtually parallel to and in one possible embodiment in alignment with the end face section in the region of the head of the tightening element. In the fitted state, therefore, the end wall in one possible embodiment forms a continuation of this end face section. The surface normal of the end wall is therefore inclined relative to the insert longitudinal axis within a region less than forty-five degrees and in one possible embodiment less than thirty degrees. The tightening angle is, for example, twenty-five degrees and at the same time the entire cutting body receptacle is inclined by an inclination angle of five degrees relative to the horizontal plane; thus the angle between the end wall and the insert longitudinal axis is twenty degrees.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments of the present application are explained in more detail below with reference to the figures. In the drawing, in each case in schematic illustrations.

DESCRIPTION OF EMBODIMENT OR EMBODIMENTS

Parts having the same effect are provided with the same designations in the figures.

Figure 1:
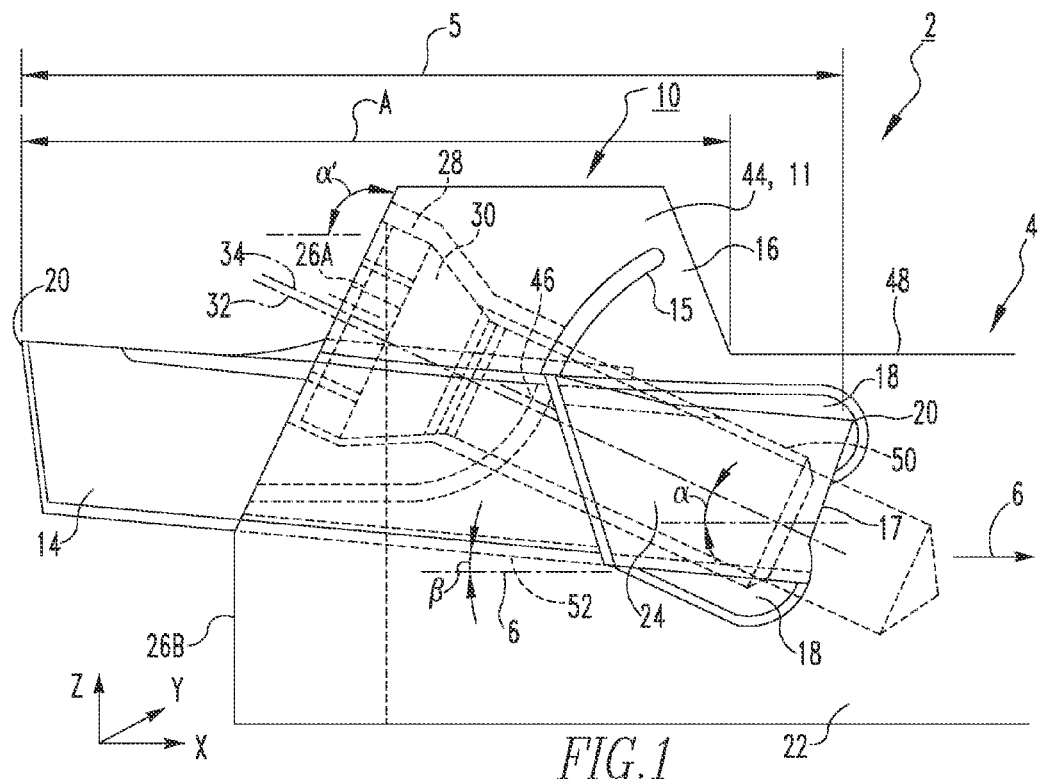
FIG. 1 shows a cutaway side view of a tool holder in the region of the clamped head with cutting body clamped in place.
Figure 2:
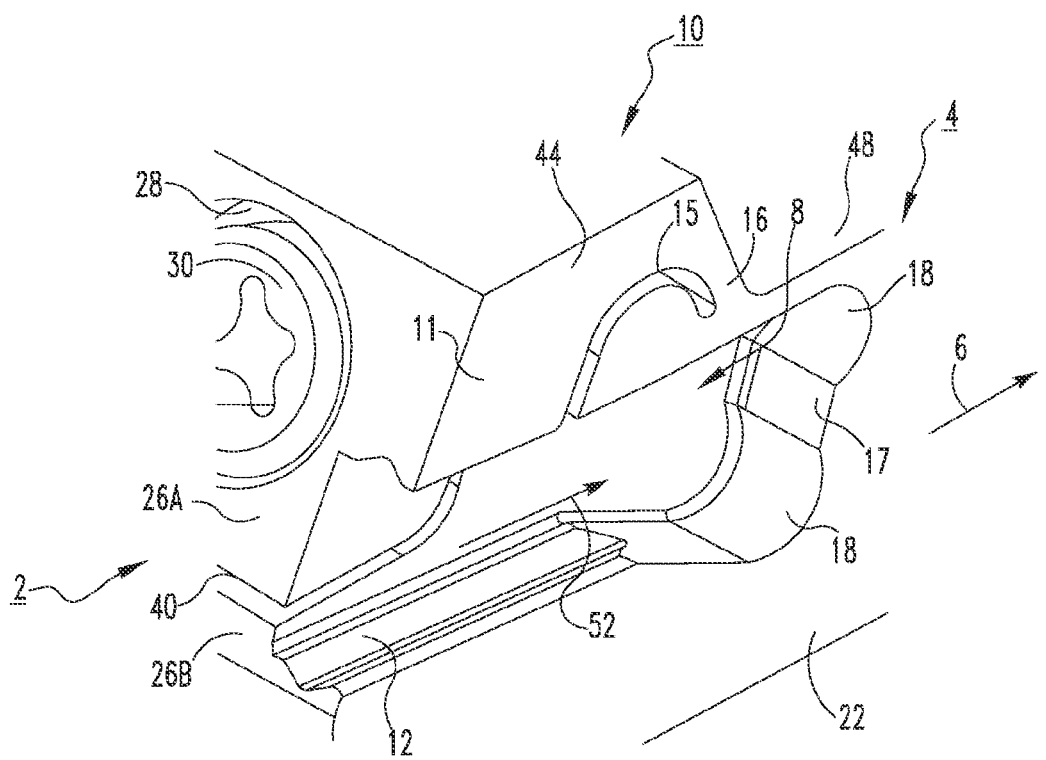
FIG. 2 shows a cutaway perspective illustration in the region of the clamping head without cutting body.

The tool holder 2 according to FIG. 1 comprises a parent body or connecting body 4 which extends in the direction of a holder longitudinal axis 6. The holder longitudinal axis 6 at the same time forms the x direction of a Cartesian coordinate system. In its height, the parent body 4 extends in the z direction of this Cartesian coordinate system. Its width extends in the x direction of the Cartesian coordinate system. In its front end region, the parent body 4 has a clamping head 10 having a cutting body receptacle 8 (cf. in this respect in FIG. 2). The clamping head 10 comprises at the top essentially a clamping claw or upper portion 11 and at the bottom a bottom bearing surface or lower portion 12. The bottom bearing surface 12 and the underside of the clamping claw 11 have a roof-shaped recess for a cutting body or cutting insert 14 (cf. FIG. 1), said recess forming a guide and said cutting body 14 engaging in said recess in a positive-locking manner in the fitted position. The clamping claw 11 is formed by incorporating a separating slot 15 in the parent body 4. The separating slot 15 separates the clamping claw 11 from the rest of the parent body 4 except for a remaining bending cross section 16. At its rear end, the cutting body receptacle or cutting insert receptacle 8 has a stop surface 17, against which the cutting body 14 is supported in the fitted position. In this case, the stop surface 17 is designed to be inclined, to be precise or general in such a way that the cutting body 14, with its rear end face, comes to bear flat against the stop surface 17, as can be seen from FIG. 1 and FIG. 4. As viewed in the z direction, recessed portions 18, each forming a free space, adjoin the stop surface 17. The respective corner regions of the cutting body 14, designed as a two-sided indexable insert, come to lie in these recessed portions 18 in the fitted end position. As a result, damage in one possible embodiment to the cutting edges 20 of the cutting body 14 is avoided, restricted, and/or minimized.

The cutting body receptacle 8 is designed to be open to a side face 22 of the parent body and is not defined in this region by a wall. In other words and according to at least one possible embodiment of the present application, one side of the cutting insert 14 contacts the tool holder 2, while the opposite side of the cutting insert 14 is exposed or open to the air.

To fasten the cutting body 14, said cutting body 14 is fastened in a clamping manner by a tightening element designed as a tightening screw 24 in the possible embodiment. To this end, the tightening screw 24, starting from a front first end face section or first side face 26A, runs inclined relative to the holder longitudinal axis 6 into the parent body 4. In this case, a countersunk receptacle or threaded hole 28 is formed in the region of the clamping head 10, a head 30 of the tightening screw coming to rest in said countersunk receptacle 28 in the fitted position. The tightening screw 24 extends along a center axis or longitudinal axis 32, relative to which the tightening screw is designed to be rotationally symmetrical or substantially symmetrical. A center line 34 of the countersunk receptacle 28 runs parallel or virtually parallel to the center axis 32, but not congruently. The center line 34 and the center axis 32 therefore have an offset relative to one another, which in one possible embodiment is within the range of between 0.2 and 0.3 millimeter.

Figure 4:
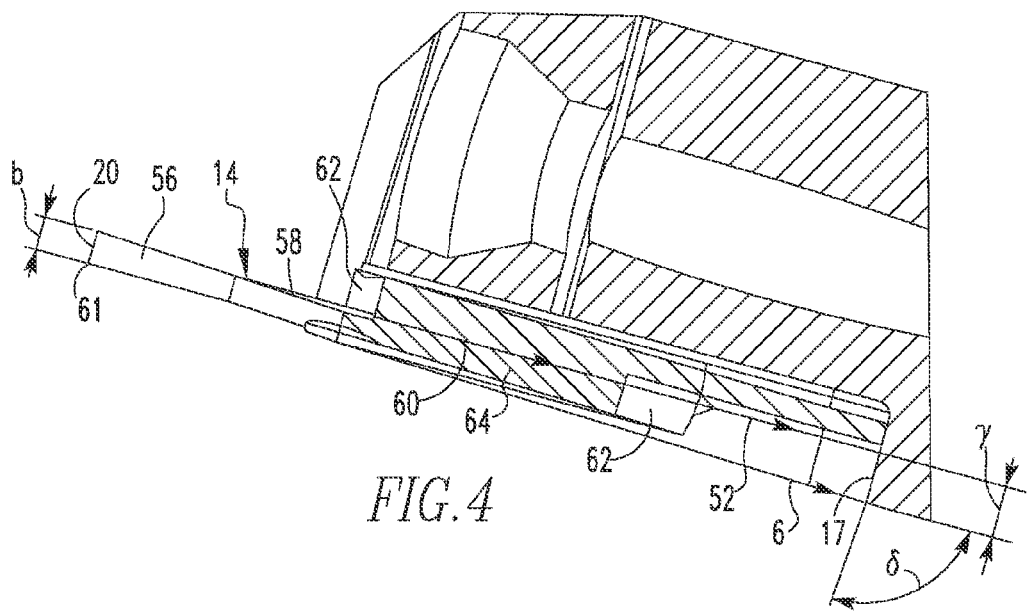
FIG. 4 shows a sectional view along section line E-E according to FIG. 3A in the front region of the tool holder.
Figure 5:
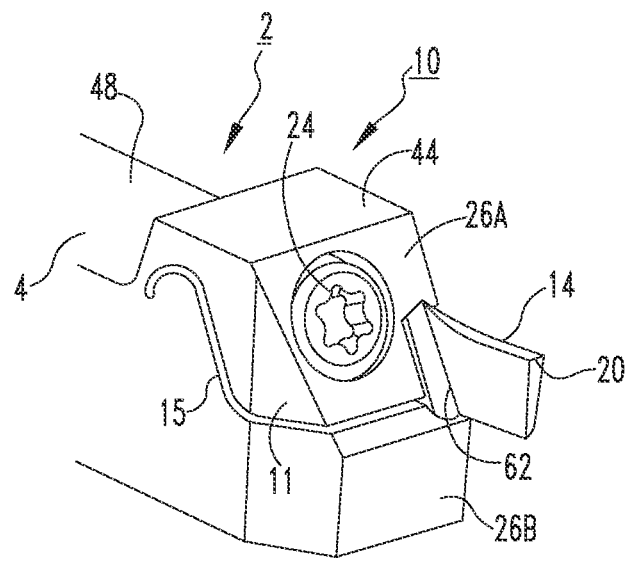
FIG. 5 shows a perspective illustration of the tool holder in the region of the clamping head.

As can be seen from FIG. 4 and/or FIG. 1, the separating slot 15, starting at the bottom end region of the first end face section 26A, runs from the front end of the parent body 4 horizontally in order to then extend in a roughly S-shaped bend into a head region 44 of the clamping claw 11. In this case, the separating slot 15 has a central section 46 which is oriented essentially perpendicularly to the center axis 32 of the tightening screw 24.

The separating slot 15 begins between the front first end face section 26A and bottom end face section or second side surface 26B and continues inwardly in the tool holder 2 toward the parent body 4. Additionally, the separating slot 15 comprises an s-shaped curve or a serpentine shape. The separating slot 15 begins adjacent the front first end face section 26A and the bottom end face section 26B and extends essentially parallel to the longitudinal axis 52. The separating slot 15 then curves to extend upwardly toward the head region 44 of the clamping claw 11, and the curves again to produce an s-shape. The center portion 46 of the s-shaped curve is disposed perpendicular or essentially perpendicular to the center axis 32 of the tightening screw 24.

The head region 44 of the clamping head 10 is in this case defined by a bead-like prominence relative to a top shank surface 48 of the parent body 4. In the possible embodiment, this prominence is designed like a trapezoid. In one possible embodiment, the separating slot 15 ends above this top boundary side 48 and inside the head region 44. This makes possible a very short head region 44 overall. A thread 50, which is incorporated in the parent body 4 such as to follow the separating slot 15, can therefore have a sufficiently large length, such that large forces can be transmitted to the clamping claw 11 and thus to the cutting body 14 via the tightening screw 24. The tightening screw 24 is sufficiently long to engage the parent body 4.

As can also be seen from FIG. 1, the cutting body receptacle 8 extends beyond the head region 44. The cutting body length S is therefore larger overall than a projecting length A. The cutting body length S is in this case defined by the largest extent of the cutting body 8 in its longitudinal direction. The projecting length A is defined by the distance between the bend region in which the head region 44 merges into the shank surface 48 and the position in which the cutting edge 20 is located in the fitted position.

The center axis 32 of the tightening screw 24 is arranged inclined within the vertical plane relative to the holder longitudinal axis 6 by a tightening angle α. The vertical plane is in this case established by the x-z plane. In the possible embodiment, the tightening angle α is about twenty-five degrees. Corresponding thereto, the first end face section 26A oriented perpendicularly or virtually perpendicularly to the center axis 32 is oriented at an angle α' to the holder longitudinal axis 6, where the relationship is α'=ninety degrees+α.

Due to this small tightening angle α, the tightening screw 24 runs into the parent body 4 with a very gentle inclination. As a result, the first end face section 26A is arranged comparatively steeply and therefore offers good accessibility of the tightening screw 24 at the front end. The latter can therefore be readily actuated from the front end without any problems. This permits simple and quick exchange of the cutting body 14 when required and/or desired, if said cutting body 14 is worn for example. It is therefore not necessary or desired for the entire tool holder 2 to be removed from the receptacle on the machine side. For this would mean considerable effort, since the tool holder is normally oriented in a highly precise or general manner inside the machine holder or inside a cassette. In one possible embodiment with the arrangement of a plurality of tool holders 2 having different tools next to and above one another, simple exchangeability and good accessibility is achieved by the small tightening angle α.

In order to achieve reliable clamping and as high a clamping force as possible on the cutting body 14 in the direction of the bottom bearing surface 12, a plurality of measures are provided, which can be used individually but in one possible embodiment lead in combination with one another to in one possible embodiment reliable clamping. This is firstly the offset between the center axis 32 and the center line 34 in such a way that the center axis 32 is arranged below the center line 34 in the z direction. Due to this eccentric arrangement of the two lines 32, 34, an additional force component is produced in the direction of the bottom bearing surface 12, thereby increasing the clamping force.

Furthermore, in order to produce a sufficiently high clamping force, the arrangement and configuration of the separating slot 15 is in one possible embodiment important. Furthermore, a comparatively large accommodating length of the cutting body 14 inside the parent body 4 is achieved by virtue of the fact that the cutting body receptacle 8 extends beyond the head region 44. This is helped, inter alia, by the fact that the cutting body receptacle 8, which extends along a longitudinal axis 52, is inclined by an inclination angle .beta. relative to the holder longitudinal axis 6. In this case, the longitudinal axis 52 runs parallel or virtually parallel to both the bottom bearing surface 12 and the underside of the clamping claw 11. The inclination angle β is in one possible embodiment within the region of five degrees.

Figure 1A:
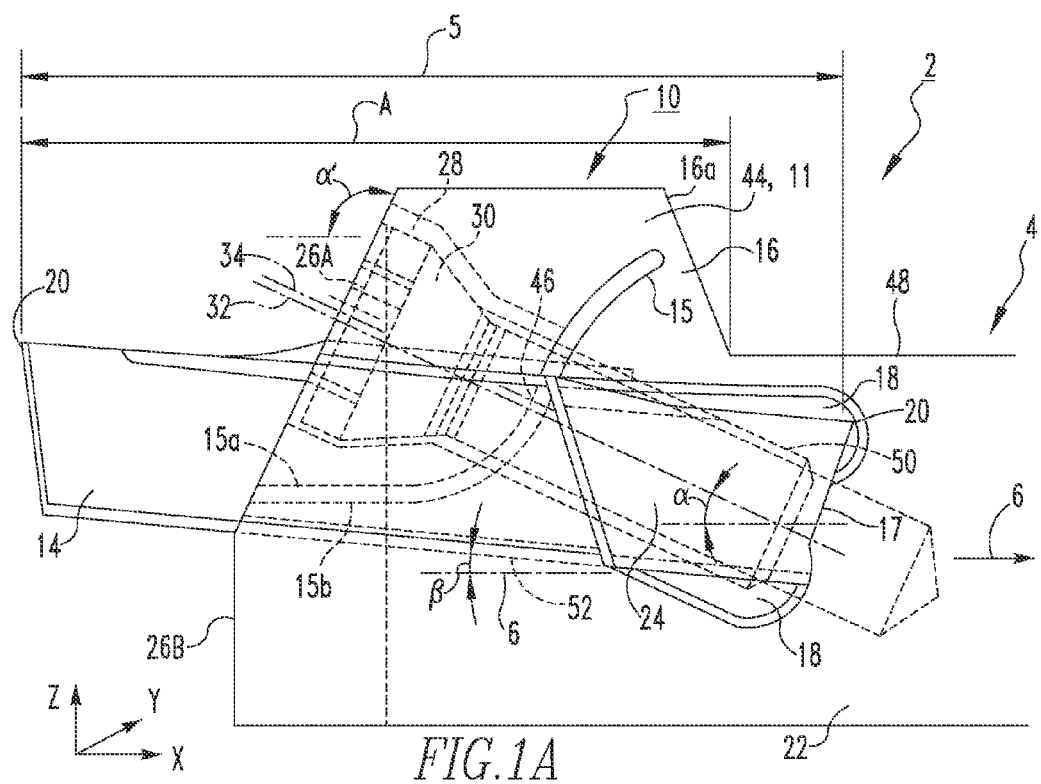
FIG. 1A shows another cutaway side view of a tool holder in the region of the clamped head with a cutting body or cutting insert clamped in place.

In at least one possible embodiment and as seen in FIG. 1A, the clamping head 10 of the tool holder 2 comprises a plurality of surfaces, including the front first end face section 26A and bottom end face section 26B. Also seen is the rear surface or side surface 16a, which is opposite the front first end face section 26A. Also seen in FIG. 1A are the surfaces 15a and 15b of the separating slot 15. The surface 15a is closer to or nearer the front first end face section 26A than the surface 15b. The surface 15b is closer to or nearer the parent body or connecting body 4 than the surface 15a.

Figure 3A:
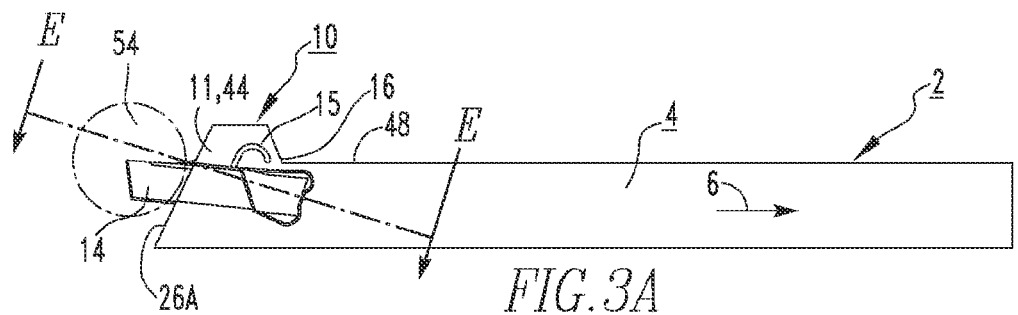
FIGS. 3A, 3B show a side view and plan view, respectively, of a tool holder with inserted cutting body.
Figure 3B:
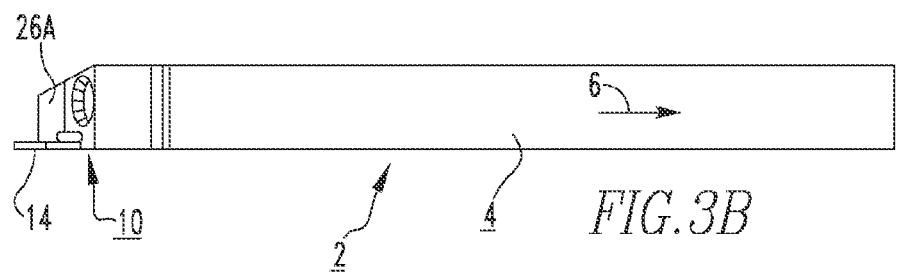

In the side view according to FIG. 3A, a workpiece 54 to be machined is additionally shown by way of example. As can be seen from FIG. 3A, the front end of the tool holder 2 requires or desires no special cutouts, recesses, etc., in order to provide a sufficient free machining space for the workpiece 54. On the contrary, it is sufficient on account of the relatively steep orientation of the front end face in accordance with the angle α' for this front end face to be designed as a flat surface.

As can be seen from the sectional illustration according to FIG. 4, the longitudinal axis 52 of the cutting body receptacle 8 is oriented at the second clearance angle γ relative to the holder longitudinal axis 6, to be precise or general with respect to the vertical plane, i.e. the longitudinal axis 52 is arranged at the secondary clearance angle γ relative to the x-z plane. In the possible embodiment, the secondary clearance angle γ is one and one-half degrees. Owing to the fact that the longitudinal axis 52 of the cutting body receptacle 8 does not run parallel or virtually parallel to the holder longitudinal axis 6, the cutting body 14 is oriented obliquely in its fitted position. In addition, the cutting body 14 has at its front end a plate-shaped cutting region 56 which widens from a narrow point 58 up to the cutting edge 20. As a result, an insert secondary clearance angle is additionally formed on the cutting body 14, said insert secondary clearance angle being formed between an insert body longitudinal axis 60 and the orientation of the outer side of the cutting region 56. In the fitted position, the insert body longitudinal axis 60 and the longitudinal axis 52 of the cutting body receptacle 52 are oriented parallel or virtually parallel to one another.

The secondary clearance angle γ, the length of the cutting body 14 and that of the cutting body receptacle 8 are now dimensioned in such a way that an outer cutting corner 61 of the cutting body 14 is in line with the side face 22 of the parent body 4. Since the zero position of the tool holder 2 in the y direction is normally defined via the side face 22, this measure essentially ensures or promotes that the cutting corner 61 is also directly located in this zero position.

The rear stop surface 17 is oriented at an angle δ of ninety degrees relative to the holder longitudinal axis 6. Therefore the stop surface 17 is additionally arranged inclined relative to the longitudinal axis 52 by the magnitude of the secondary clearance angle γ. The stop surface 17 is thus inclined relative to the longitudinal axis 52 at an angle of ninety-one and one-half degrees. A corresponding angle of the rear end face of the cutting body 14 is thereby corrected. As can be seen from FIG. 1, the cutting body 14 bears against the stop surface 17 merely with a central region of the end face adjoining the cutting edge 20. Due to the correction carried out by the angle δ, this end face bears as flat as possible against the stop surface 17. This is because, on account of the secondary clearance angle γ, the cutting edge 20 is likewise oriented at an angle, corresponding to the magnitude of the secondary clearance angle, to the longitudinal axis 52 and thus to the insert body longitudinal axis 60. This measure essentially ensures or promotes that the cutting edge 20 is oriented exactly perpendicularly or virtually perpendicularly to the holder longitudinal axis 6.

This means, during a machining operation, namely the "grooving operation," that the workpiece surface machined via the cutting edge 20 is oriented perpendicularly or virtually perpendicularly to the infeed direction and thus to the holder longitudinal axis 6. The length of the cutting edge 20 defines in this case the "grooving width" b. The latter, starting from the cutting corner 61, is in principle freely adjustable up to the thickness of the central region 64. By the provision of cutting bodies 14 having different grooving widths b, it is therefore possible, without any problems, to realize different grooving widths b using the same tool holder 2.

The cutting corner 61 in one possible embodiment lies in line with the outer marginal side of the central region 64. Sufficient freedom of movement of the cutting edge 20 on its outer side is achieved due to the secondary clearance angle γ. On the inner side face 76, opposite the cutting corner 61, of the cutting region 56, the latter has a clearance angle. Due to the inclination of the cutting body 14, said clearance angle is formed as a double clearance angle in order to compensate for the inclination.

Three different embodiment variants of the tool holder 2 are shown in FIGS. 5, 6 and 7A, 7B. In the embodiment variant according to FIG. 5, a second, bottom end face section 26B adjoins the top, first end face section 26A and is oriented approximately perpendicularly to the holder longitudinal axis 6. In this case, the separating slot 15 is arranged to run transversely in the bottom fifth of the top, first end face section 26A. An end wall 62 of a thickened central region 64 of the cutting body 14 (for the thickened central region 64, cf., in one possible embodiment, FIGS. 8A, 8B and FIG. 4) is in this case arranged in alignment with the first end face section 26A.

Figure 6:
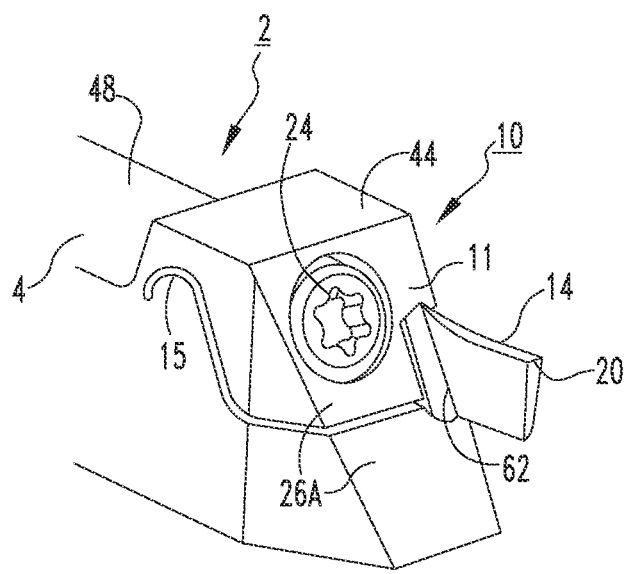
FIG. 6 shows a perspective illustration of an alternative configuration in the region of the clamping head.
Figure 7A:
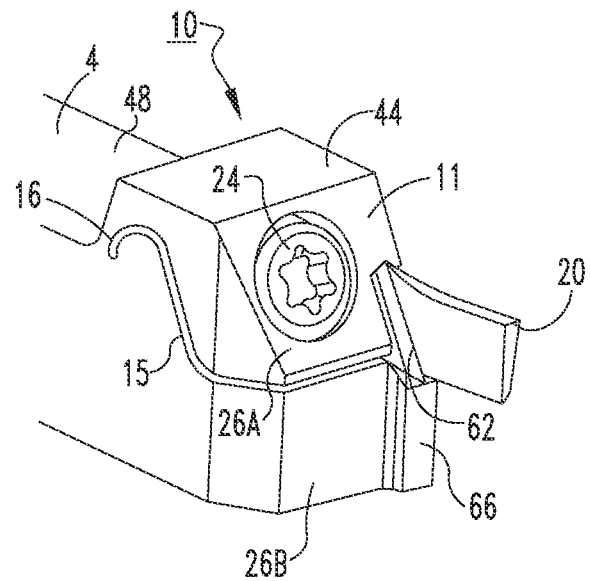
FIGS. 7A, 7B show two perspective illustrations of a further embodiment variant in the region of the clamping head.
Figure 7B:
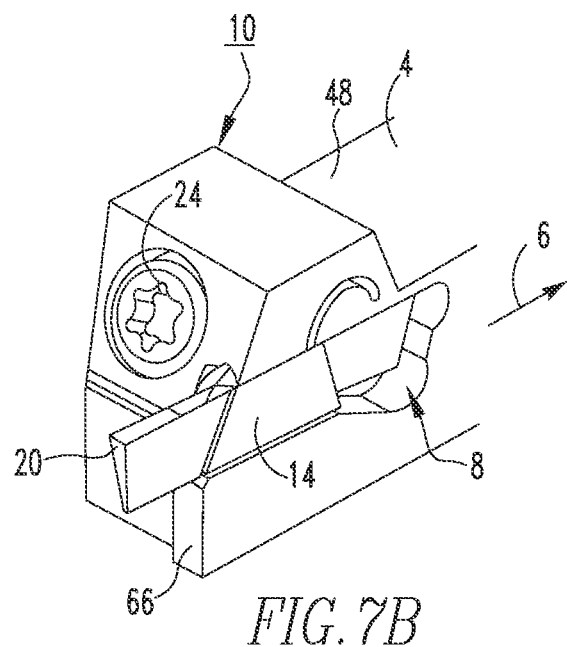

In the embodiment variant according to FIG. 6, one continuous end face section 26A is provided, which is subdivided approximately in its center by the separating slot 15. In the embodiment variant according to FIGS. 7A, 7B, a second, approximately vertically oriented bottom end face section 26B is again provided. The separating slots 15 is arranged, in this embodiment variant, below the first end face section 26A. In this embodiment, the risk of removed chips jamming in the separating slot 15 is slight, since an enlarged free space is available on account of the vertical orientation of the second end face section 26B. At the same time, a supporting web 66 which additionally supports the cutting body 14 in its central region 64 is drawn out below the cutting body 14.

In the possible embodiments shown in FIGS. 2, 5 to 7, the separating slot 15 in each case runs into the head region 44 and has a turning point there at a highest point in order to then run downward in a curved manner. The separating slot 15 is therefore designed like a walking stick in its top and central regions. Due to this measure, the central section 46 is displaced as far as possible in the direction of the front end. At the same time, the separating slot 15 is drawn right up close to the bend region between the head region 44 and the top shank surface 48, such that a remaining bending cross section 16 is obtained.

Figure 8A:
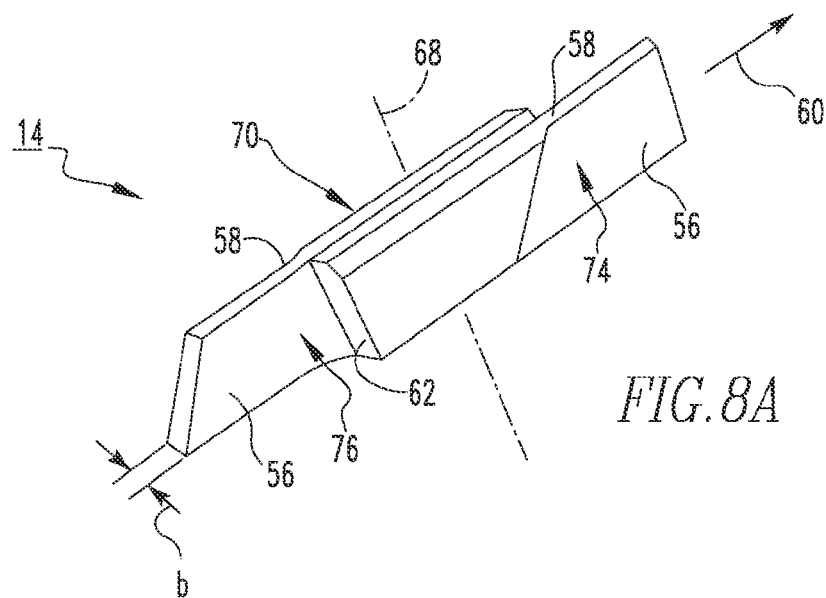
FIG. 8A shows a perspective illustration of a cutting body in the direction of view of the underside.
Figure 8B:
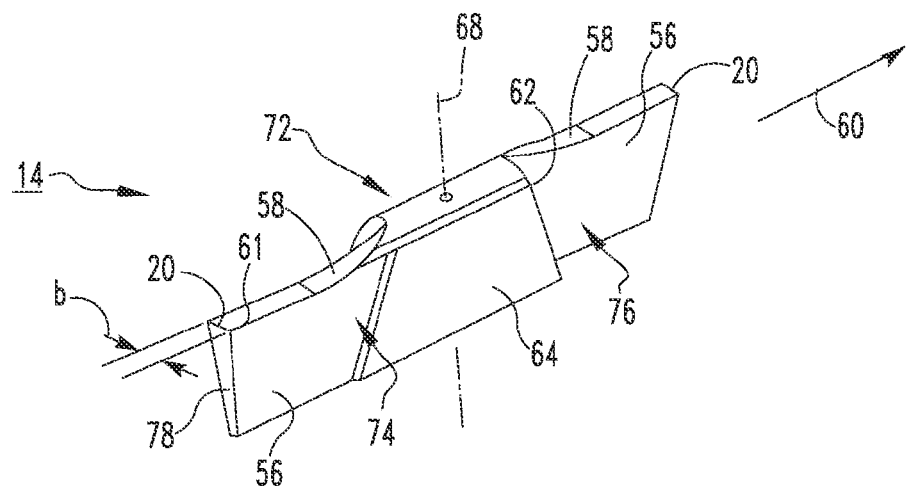
FIG. 8B shows a perspective illustration of the cutting body shown in FIG. 8A in the direction of view of the top side of the cutting body.

A cutting body 14 intended for use in the tool holder 2 described is shown schematically in FIGS. 8A, 8B. FIG. 8A shows in this case the underside 70 of the cutting body 14, said underside 70 being tightened against the bottom bearing surface 12 in the fitted state. Conversely, FIG. 8B shows the top side 72 of the cutting body 14, against which the underside of the clamping claw 11 is tightened. Both the underside 70 and the top side 72 have a roughly roof-shaped prominence which engages in a positive-locking manner in the bottom bearing surface 12 and the underside of the clamping claw 11, respectively.

The cutting body 14 is designed overall like a double-sided indexable insert which is of one hundred eighty degrees rotationally symmetrical design relative to a center rotation axis 68. The cutting body 14 is subdivided overall more or less into three regions. These are the thickened central region 64 and the plate-shaped cutting regions 56 adjoining said central region 64 on both sides. The smallest narrow point 58 of the cutting body 14 is formed directly in the transition region between the thickened central region 64 and the cutting region 56. The cutting region 56 widens from here continuously up to the front cutting edge 20.

Starting from the cutting edge 20, which is formed on the top side 72, the cutting region 56 tapers downward toward the underside 70. At the same time, the top side 72 is also beveled toward the cutting region 56 starting from the thickened central region 64, such that the section of the top side 72 in the cutting region 56 is arranged, in the z direction, slightly below the section of the top side 72 in the thickened central region 64.

Whereas the cutting body 14 has, at its outer side face 74, in the transition region between the central region 64 and the cutting region 56, merely an edge and a slight recess, the end wall 62, which is oriented obliquely to the insert longitudinal axis 60, is arranged at its inner side face 76 in this transition region.

As viewed from the top side 72, the cutting corner 61 lies on a rectilinear extension of the outer side of the central region 64. The cutting corner 61 is therefore in alignment with the outer side of the central region 64 and thus lies with this outer side in the same plane. A front end 78 extends downward starting from the cutting edge 20, said front end 78 enclosing a clearance angle with the cutting edge 20. The front end 78 is trapezoidal, such that the cutting region 56 tapers downward overall. As a result, the recess already mentioned is formed in the bottom region toward the central region 64. This recess is zero at the top edge, since the cutting corner 61 is in alignment with the outer side of the central region 64. At the same time, the front end 78 is inclined relate to the center rotation axis 68.

In order to permit simple exchangeability of a cutting body 14, provision is made in a tool holder 2, in one possible embodiment for a grooving tool, for the cutting body 14 to be held in a clamping manner in a cutting body receptacle 8 by means of a clamping claw 11 and a tightening screw 24. The tightening screw 24 extends in this case along a center axis 32 which is oriented at a tightening angle α relative to a holder longitudinal axis 6. The tightening angle α is in this case less than forty-five degrees and in one possible embodiment less than thirty degrees. This provides for good accessibility of the tightening screw 24 at the front end, such that simple exchange of the cutting body 14 is made possible.

One feature or aspect of an embodiment is believed at the time of the filing of this patent application to possibly reside broadly in a tool holder 2, in one possible embodiment for a grooving tool, having a parent body 4 which extends along a holder longitudinal axis 6 in the x direction and the width of which extends in the y direction and the height of which extends in the z direction and which has at the front end a clamping head 10 for accommodating a cutting body 14, wherein the clamping head 10 has a cutting body receptacle 8 defined by a clamping claw 11 and a bottom bearing surface 12, wherein a separating slot 15 runs between the clamping claw 11 and the bearing surface 12, and the clamping claw 11 can be tightened in the direction of the bottom bearing surface 12 by means of a tightening element 24 inclined relative to the holder longitudinal axis 6 and extending over the separating slot 15, wherein a center axis 32 of the tightening element 24 encloses a tightening angle α less than forty-five degrees and in one possible embodiment less than thirty degrees relative to the holder longitudinal axis 6.

Another feature or aspect of an embodiment is believed at the time of the filing of this patent application to possibly reside broadly in the tool holder 2, wherein the clamping claw 11 has a countersunk receptacle 28 for accommodating a head 30 of the tightening element 24, said countersunk receptacle 28 extending along a center line 34, the centre axis 32 of the tightening element 24 being arranged offset from the center line 34 of the countersunk receptacle 28 in the direction of the bottom bearing surface 12.

Yet another feature or aspect of an embodiment is believed at the time of the filing of this patent application to possibly reside broadly in the tool holder 2, wherein an end face, running next to the cutting body receptacle 8, of the parent body is formed by at most two flat end faces sections 26A, B.

Still another feature or aspect of an embodiment is believed at the time of the filing of this patent application to possibly reside broadly in the tool holder 2, wherein the clamping claw 11 is separated from the parent body 4 by a separating slot 15 except for a bending cross section 16, and in that the parent body 4 has in the region of the tightening element 24 an end face section 26A which is inclined relative to the holder longitudinal axis 6 and which extends free of edges up to the separating slot 15.

A further feature or aspect of an embodiment is believed at the time of the filing of this patent application to possibly reside broadly in the tool holder 2, wherein the clamping claw 11 is separated from the parent body 4 by the separating slot 15 except for a bending cross section 16, the bending cross section 16 lying within the clamping head 10, the extent of said bending cross section 16 in the direction of the holder longitudinal axis 6 being determined by a head region 44 which is raised relative to a top shank surface 48 of the parent body 4.

Another feature or aspect of an embodiment is believed at the time of the filing of this patent application to possibly reside broadly in the tool holder 2, wherein the cutting head receptacle 8 extends in the direction of the holder longitudinal axis 6 beyond the head region 44.

Yet another feature or aspect of an embodiment is believed at the time of the filing of this patent application to possibly reside broadly in the tool holder 2, wherein the separating slot 15 ends in the raised head region 44.

Still another feature or aspect of an embodiment is believed at the time of the filing of this patent application to possibly reside broadly in the tool holder 2, wherein the separating slot 15 runs in an S shape and is oriented in a central section 46 approximately perpendicularly to the center axis 32 of the tightening element 24.

One feature or aspect of an embodiment is believed at the time of the filing of this patent application to possibly reside broadly in a grooving tool, which grooving tool is configured to cut grooves in workpieces, said grooving tool comprising: a grooving tool tool holder configured to permit replacement of grooving inserts in order to provide secure clamping of replacement grooving inserts during operation of a machine tool and to permit a grooving insert to be replaced in said tool holder without said tool holder being moved in a machine tool in which said tool holder is installed; said grooving tool tool holder having: a length, a height, and a width; said grooving tool tool holder length being greater than either said grooving tool tool holder height or said grooving tool tool holder width; a grooving tool tool holder longitudinal axis extending along said grooving tool tool holder length; a clamping head being disposed on a first end of said grooving tool tool holder length and being configured and disposed to accept a grooving insert; said clamping head comprising: a top surface in operation; a bottom surface in operation; a first side surface being disposed adjacent said first end of said grooving tool tool holder length and being disposed adjacent said top surface; a second side surface being disposed adjacent said first end of said grooving tool tool holder length and being disposed adjacent said bottom surface; a third side surface being disposed adjacent said top surface and being opposite said first side surface; a grooving insert being configured to cut a groove in a workpiece and comprising: a length, a height, and a width; said grooving insert length being greater than either said grooving insert height or said cutting insert width; said grooving insert further comprising two sides being disposed vertically when in operation, extending along said grooving insert length, and being opposite one another; and said grooving insert further comprising at least one cutting edge being disposed on each end of said grooving insert; a connecting body extending away from said first end of said grooving tool tool holder length and extending away from said clamping head in the direction of the grooving tool tool holder longitudinal axis and being configured to connect said grooving tool to a machine tool; said clamping head comprising a receptacle being configured and disposed to accept said grooving insert such that one side of said grooving insert is in contact with said grooving tool tool holder and the other side of said grooving insert is open to the air; said grooving insert receptacle comprising two v-shaped slots, which two v-shaped slots extend in the direction of said grooving tool tool holder longitudinal axis and are configured and disposed to allow said grooving insert to slide into said grooving insert receptacle upon assembly; said grooving insert further comprises two v-shaped projections being configured to slide into said two v-shaped slots of said grooving insert receptacle and being disposed in said two v-shaped slots, upon said grooving insert being slid into said grooving insert receptacle and upon assembly; said grooving insert receptacle further comprising a stop surface being disposed opposite said first end of said grooving tool tool holder length; said grooving insert being configured to rest against said stop surface, upon said grooving insert being slid into said grooving insert receptacle and upon assembly, and being disposed against said stop surface; said clamping head comprising an upper portion, during use, being disposed on a first side of said grooving insert receptacle and being adjacent said first side surface of said clamping head; said clamping head comprising a lower portion, during use, being disposed on a second side of said grooving insert receptacle, which second side is opposite said first side, and being adjacent said second side surface of said clamping head; a separating slot being disposed between and separating said upper portion, during use, of said clamping head and said lower portion, during use, of said clamping head; said separating slot comprising a first surface and a second surface; said first surface and said second surface being substantially parallel; said first surface of said separating slot being disposed nearer to said first side surface of said clamping head than said second surface of said separating slot; said second surface of said separating slot being disposed nearer to said connecting body than said first surface of said separating slot; said separating slot comprising a substantially s-shaped curve in a cross-sectional view, which substantially s-shaped curve comprises: a first slot portion, in which said first surface and said second surface extend from said first end of said grooving tool tool holder length toward said connecting body and said first surface and said second surface extend substantially parallel to said grooving tool tool holder longitudinal axis; a second slot portion extending from said first slot portion and curving toward said upper portion, during use, of said clamping head, in which said first surface curves convexly toward said connecting body and said second surface curves concavely away from said first side surface of said clamping head; a third slot portion extending from said second slot portion, in which said first surface and said second surface are substantially straight; and a fourth slot portion extending from said third slot portion, in which said first surface curves concavely away from said connecting body and said second surface curves convexly toward said first side surface; a threaded clamping screw being configured and disposed to: extend between and connect said upper portion, during use, of said clamping head and said lower portion, during use, of said clamping head; narrow said separating slot by bringing said upper portion, during use, of said clamping head and said lower portion, during use, of said clamping head closer together to clamp said clamping head about said grooving insert; and expand said separating slot by moving said upper portion, during use, of said clamping head and said lower portion, during use, of said clamping head farther apart to loosen said clamping head around said grooving insert; said threaded clamping screw longitudinal axis being inclined with respect to the grooving tool tool holder longitudinal axis at an angle of less than about forty-five degrees, which angle permits accessibility for loosening and tightening of said threaded clamping screw, and permits replacing grooving inserts in said grooving insert receptacle, in order to provide secure clamping of replacement grooving inserts during operation of a machine tool in which access to said upper portion and/or side portions, during use, is blocked, such that an adjustment tool for said threaded clamping screw is blocked from accessing a threaded clamping screw disposed on an upper and/or side portion, during use, of a grooving tool tool holder, and further permits a grooving insert to be replaced in said tool holder without said tool holder being moved in a machine tool in which said tool holder is installed; and said threaded clamping screw longitudinal axis being substantially perpendicular to said first surface and said second surface of said third slot portion of said separating slot.

Another feature or aspect of an embodiment is believed at the time of the filing of this patent application to possibly reside broadly in the grooving tool, wherein: said angle is less than about thirty degrees; said upper portion, during use, of said clamping head comprises a countersunk receptacle for accommodating a head of said threaded clamping screw, which countersunk receptacle extends along a center line; the longitudinal axis of said threaded clamping screw is arranged offset from the center line of said countersunk receptacle in the direction of said lower portion, during use, of said clamping head; and an end face, running next to said cutting insert receptacle is formed by said first side surface and said second side surface.

Yet another feature or aspect of an embodiment is believed at the time of the filing of this patent application to possibly reside broadly in the tool holder, wherein: said upper portion, during use, of said clamping head is separated from said connecting body by said separating slot except for a bending cross section; said first side surface is in the region of said threaded clamping screw and said first side surface is inclined relative to the grooving tool tool holder longitudinal axis and which extends free of edges up to said separating slot; said upper portion, during use, of said clamping head is separated from said connecting body by said separating slot except for said bending cross section; said bending cross section lies within said clamping head, the extent of said bending cross section in the direction of the grooving tool tool holder longitudinal axis being determined by a head region which is raised relative to a top shank surface of said connecting body; said cutting insert receptacle extends in the direction of said grooving tool tool holder longitudinal axis beyond said head region; and said separating slot ends in the raised head region.

Still another feature or aspect of an embodiment is believed at the time of the filing of this patent application to possibly reside broadly in a tool holder of a machine tool configured to permit replacement of cutting inserts in order to provide substantially secure clamping of replacement cutting inserts during operation of a machine tool and in order to permit a cutting insert to be replaced in said tool holder without said tool holder being moved in a machine tool in which said tool holder is installed, said tool holder comprising: a length, a height, and a width; said tool holder length being greater than either said tool holder height or said tool holder width; a tool holder longitudinal axis extending along said tool holder length; a clamping head being disposed on a first end of said tool holder length and being configured and disposed to accept a cutting insert; said clamping head comprising a receptacle being configured and disposed to accept a cutting insert; said clamping head comprising a first portion being disposed on a first side of said cutting insert receptacle; said clamping head comprising a second portion being disposed on a second side of said cutting insert receptacle, which second side is opposite said first side, and said second portion being adjacent said first portion; a separating slot being disposed between and separating said first portion of said clamping head and said second portion of said clamping head; a tightening element being configured and disposed to: extend between and connect said first portion of said clamping head and said second portion of said clamping head; narrow said separating slot by bringing said first portion of said clamping head and said second portion of said clamping head closer together to clamp said clamping head about a cutting insert; and expand said separating slot by moving said first portion of said clamping head and said second portion of said clamping head farther apart to loosen said clamping head around a cutting insert; and said tightening element comprising a tightening element longitudinal axis; said tightening element longitudinal axis being disposed with respect to the tool holder longitudinal axis at an angle, which angle permits accessibility for loosening and tightening of said tightening element, and thereby to permit replacing cutting inserts in said cutting insert receptacle, in order to provide substantially secure clamping of replacement cutting inserts during operation of a machine tool and thus permit a cutting insert to be replaced in said tool holder without said tool holder being moved in a machine tool in which said tool holder is installed; and said angle being less than about forty-five degrees.

A further feature or aspect of an embodiment is believed at the time of the filing of this patent application to possibly reside broadly in the tool holder, wherein: said clamping head comprises: a short surface; a long surface; a first side surface being disposed adjacent said first end of said tool holder length and being disposed adjacent said short surface; a second side surface being disposed adjacent said first end of said tool holder length and being disposed adjacent said long surface; and a third side surface being disposed adjacent said short surface and being opposite said first side surface; and said angle permits replacing cutting inserts in said cutting insert receptacle, in order to provide secure clamping of replacement cutting inserts during operation of a machine tool in which access to said first portion and/or side portions, during use, is blocked, such that an adjustment tool for said tightening element is blocked from accessing a tightening element disposed on a first portion and/or side portion, during use, of a tool holder.

Another feature or aspect of an embodiment is believed at the time of the filing of this patent application to possibly reside broadly in the tool holder, wherein: said tool holder further comprises a connecting body extending away from said first end of said tool holder length and extending away from said clamping head in the direction of the tool holder longitudinal axis and being configured to connect said tool holder to a machine tool; said cutting insert receptacle is configured and disposed to accept a cutting insert such that one side of a cutting insert is in contact with said tool holder and the other side of the cutting insert is open to the air; said cutting insert receptacle comprises two v-shaped slots, which two v-shaped slots extend in the direction of said tool holder longitudinal axis and are configured and disposed to allow a cutting insert to slide into said grooving insert receptacle upon assembly; said cutting insert receptacle further comprises a stop surface being disposed opposite said first end of said tool holder length; said separating slot comprises a first surface and a second surface; said first surface and said second surface are substantially parallel; said first surface of said separating slot is disposed nearer to said first side surface of said clamping head than said second surface of said separating slot; said second surface of said separating slot is disposed nearer to said connecting body than said first surface of said separating slot; said separating slot comprises a substantially s-shaped curve in a cross-sectional view, which substantially s-shaped curve comprises: a first slot portion, in which said first surface and said second surface extend from said first end of said tool holder length toward said connecting body and said first surface and said second surface extend substantially parallel to said tool holder longitudinal axis; a second slot portion extending from said first slot portion and curving toward said first portion of said clamping head, in which said first surface curves convexly toward said connecting body and said second surface curves concavely away from said first side surface of said clamping head; a third slot portion extending from said second slot portion, in which said first surface and said second surface are substantially straight; and a fourth slot portion extending from said third slot portion, in which said first surface curves concavely away from said connecting body and said second surface curves convexly toward said first side surface; and said tightening element longitudinal axis being substantially perpendicular to said first surface and said second surface of said third slot portion of said separating slot.

Yet another feature or aspect of an embodiment is believed at the time of the filing of this patent application to possibly reside broadly in the tool holder, wherein said angle is less than about thirty degrees.

Still another feature or aspect of an embodiment is believed at the time of the filing of this patent application to possibly reside broadly in the tool holder, wherein said first portion of said clamping head comprises a countersunk receptacle for accommodating a head of said tightening element, which countersunk receptacle extends along a center line, the center axis of said tightening element being arranged offset from the center line of said countersunk receptacle in the direction of said second portion of said clamping head.

A further feature or aspect of an embodiment is believed at the time of the filing of this patent application to possibly reside broadly in the tool holder, wherein an end face, running next to said cutting insert receptacle is formed by said first side surface and said second side surface.

Another feature or aspect of an embodiment is believed at the time of the filing of this patent application to possibly reside broadly in the tool holder, wherein: said first portion of said clamping head is separated from said connecting body by said separating slot except for a bending cross section; and said first side surface is in the region of said tightening element and said first side surface is inclined relative to the tool holder longitudinal axis and which extends free of edges up to said separating slot.

Yet another feature or aspect of an embodiment is believed at the time of the filing of this patent application to possibly reside broadly in the tool holder, wherein: said first portion of said clamping head is separated from said connecting body by said separating slot except for said bending cross section; said bending cross section lies within said clamping head, the extent of said bending cross section in the direction of the tool holder longitudinal axis being determined by a head region which is raised relative to a top shank surface of said connecting body.

Still another feature or aspect of an embodiment is believed at the time of the filing of this patent application to possibly reside broadly in the tool holder, wherein: said cutting insert receptacle extends in the direction of said tool holder longitudinal axis beyond said head region; and said separating slot ends in the raised head region.

A further feature or aspect of an embodiment is believed at the time of the filing of this patent application to possibly reside broadly in a tool holder of a machine tool configured to permit replacement of cutting inserts in order to provide substantially secure clamping of replacement cutting inserts during operation of a machine tool and in order to permit a cutting insert to be replaced in said tool holder without said tool holder being moved in a machine tool in which said tool holder is installed, said tool holder comprising: a length, a height, and a width; said tool holder length being greater than either said tool holder height or said tool holder width; a tool holder longitudinal axis extending along said tool holder length; a clamping head being disposed on a first end of said tool holder length and being configured and disposed to accept a cutting insert; said clamping head comprising a receptacle being configured and disposed to accept a cutting insert; said clamping head comprising a first portion being disposed on a first side of said cutting insert receptacle; said clamping head comprising a second portion being disposed on a second side of said cutting insert receptacle, which second side is opposite said first side, and said second portion being adjacent said first portion; a separating slot being disposed between and separating said first portion of said clamping head and said second portion of said clamping head; a tightening element being configured and disposed to: extend between and connect said first portion of said clamping head and said second portion of said clamping head; narrow said separating slot by bringing said first portion of said clamping head and said second portion of said clamping head closer together to clamp said clamping head about a cutting insert; and expand said separating slot by moving said first portion of said clamping head and said second portion of said clamping head farther apart to loosen said clamping head around a cutting insert; and said tightening element comprising a tightening element longitudinal axis; said tightening element longitudinal axis being disposed with respect to the tool holder longitudinal axis at an angle, which angle permits accessibility for loosening and tightening of said tightening element, and thereby to permit replacing cutting inserts in said cutting insert receptacle, in order to provide substantially secure clamping of replacement cutting inserts during operation of a machine tool in which access to said first portion and/or side portions is blocked, such that an adjustment tool for said threaded clamping screw is blocked from accessing a threaded clamping screw disposed on an upper and/or side portion, during use, of a grooving tool tool holder, and thus permit a cutting insert to be replaced in said tool holder without said tool holder being moved in a machine tool in which said tool holder is installed; and said angle being an acute angle substantially less than ninety degrees.

One feature or aspect of an embodiment is believed at the time of the filing of this patent application to possibly reside broadly in the tool holder, wherein said angle is less than 45 degrees.

Another feature or aspect of an embodiment is believed at the time of the filing of this patent application to possibly reside broadly in the tool holder, wherein said clamping head comprises: a short surface; a long surface; a first side surface being disposed adjacent said first end of said tool holder length and being disposed adjacent said short surface; a second side surface being disposed adjacent said first end of said tool holder length and being disposed adjacent said long surface; and a third side surface being disposed adjacent said short surface and being opposite said first side surface.

Yet another feature or aspect of an embodiment is believed at the time of the filing of this patent application to possibly reside broadly in the tool holder, wherein: said tool holder further comprises a connecting body extending away from said first end of said tool holder length and extending away from said clamping head in the direction of the tool holder longitudinal axis and being configured to connect said tool holder to a machine tool; said cutting insert receptacle is configured and disposed to accept a cutting insert such that one side of a cutting insert is in contact with said tool holder and the other side of the cutting insert is open to the air; said cutting insert receptacle comprises two v-shaped slots, which two v-shaped slots extend in the direction of said tool holder longitudinal axis and are configured and disposed to allow a cutting insert to slide into said grooving insert receptacle upon assembly; said cutting insert receptacle further comprises a stop surface being disposed opposite said first end of said tool holder length; said separating slot comprises a first surface and a second surface; said first surface and said second surface are substantially parallel; said first surface of said separating slot is disposed nearer to said first side surface of said clamping head than said second surface of said separating slot; said second surface of said separating slot is disposed nearer to said connecting body than said first surface of said separating slot; said separating slot comprises a substantially s-shaped curve in a cross-sectional view, which substantially s-shaped curve comprises: a first slot portion, in which said first surface and said second surface extend from said first end of said tool holder length toward said connecting body and said first surface and said second surface extend substantially parallel to said tool holder longitudinal axis; a second slot portion extending from said first slot portion and curving toward said first portion of said clamping head, in which said first surface curves convexly toward said connecting body and said second surface curves concavely away from said first side surface of said clamping head; a third slot portion extending from said second slot portion, in which said first surface and said second surface are substantially straight; and a fourth slot portion extending from said third slot portion, in which said first surface curves concavely away from said connecting body and said second surface curves convexly toward said first side surface; and said tightening element longitudinal axis being substantially perpendicular to said first surface and said second surface of said third slot portion of said separating slot.

Still another feature or aspect of an embodiment is believed at the time of the filing of this patent application to possibly reside broadly in the tool holder, wherein said angle is less than about thirty degrees.

A further feature or aspect of an embodiment is believed at the time of the filing of this patent application to possibly reside broadly in the tool holder, wherein said first portion of said clamping head comprises a countersunk receptacle for accommodating a head of said tightening element, which countersunk receptacle extends along a center line, the center axis of said tightening element being arranged offset from the center line of said countersunk receptacle in the direction of said second portion of said clamping head.

Another feature or aspect of an embodiment is believed at the time of the filing of this patent application to possibly reside broadly in the tool holder, wherein an end face, running next to said cutting insert receptacle is formed by said first side surface and said second side surface.

Yet another feature or aspect of an embodiment is believed at the time of the filing of this patent application to possibly reside broadly in the tool holder, wherein: said first portion of said clamping head is separated from said connecting body by said separating slot except for a bending cross section; said first side surface is in the region of said tightening element and said first side surface is inclined relative to the tool holder longitudinal axis and which extends free of edges up to said separating slot; said first portion of said clamping head is separated from said connecting body by said separating slot except for said bending cross section; said bending cross section lies within said clamping head, the extent of said bending cross section in the direction of the tool holder longitudinal axis being determined by a head region which is raised relative to a top shank surface of said connecting body; said cutting insert receptacle extends in the direction of said tool holder longitudinal axis beyond said head region; and said separating slot ends in the raised head region.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Apr. 17, 2008, and/or cited elsewhere are hereby incorporated by reference as if set forth in their entirety herein as follows: DE 101 32 721, having the following English translation of the German title "CUTTING DEVICE," published Jan. 23, 2003; EP 1 252 954, having the title "CUTTING TOOL FOR PARTING AND GROOVING OPERATIONS," published on Oct. 30, 2002; DE 88 04 365, having applicant Klaus KEMMER, ING., published on May 11, 1988; FR 2 373 349, having the French title "OUTIL DE COUPE À

INSERTION DU TAILLANT," published Jul. 7, 1978; DE 27 55 003, having the German title "SCHNEIDWERKZEUNG MIT SCHNEIDEINSATZ," published Jun. 15, 1978; and EP 1 533 056, having the title "CUTTING TOOL HEAD FOR A METAL WORKING TOOL," published on May 25, 2005.

The patents, patent applications, and patent publication listed above in the preceding paragraph are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 059 717.3, filed on Dec. 18, 2006, having inventor Igor KAUFMANN, and DE-OS 10 2006 059 and DE-PS 10 2006 059 717.3, and International Application No. PCT/2007/008794, filed on Oct. 10, 2007, having WIPO Publication No. WO 2008/074374 and inventor Igor KAUFMANN, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/2007/008794 and German Patent Application 10 2006 059 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/2007/008794 and DE 10 2006 059 717.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A tool holder of a machine tool configured to permit replacement of cutting inserts in order to provide substantially secure clamping of replacement cutting inserts during operation of a machine tool and in order to permit a cutting insert to be replaced in said tool holder without said tool holder being moved in a machine tool in which said tool holder is installed, said tool holder comprising:
- a length, a height, and a width;
- said tool holder length being greater than either said tool holder height or said tool holder width;
- a tool holder longitudinal axis extending along said tool holder length;
- a clamping head being disposed on a first end of said tool holder length and being configured and disposed to accept a cutting insert;
- said clamping head comprising a cutting insert receptacle being configured and disposed to accept a cutting insert;
- said clamping head comprising a first portion being disposed on a first side of said cutting insert receptacle;
- said clamping head comprising a second portion being disposed on a second side of said cutting insert receptacle, which second side is opposite said first side, and said second portion being adjacent said first portion;
- a separating slot being disposed between and separating said first portion of said clamping head and said second portion of said clamping head;
- a tightening element being configured and disposed to:
  - extend between and connect said first portion of said clamping head and said second portion of said clamping head;
  - narrow said separating slot by bringing said first portion of said clamping head and said second portion of said clamping head closer together to clamp said clamping head about a cutting insert; and
  - expand said separating slot by moving said first portion of said clamping head and said second portion of said clamping head farther apart to loosen said clamping head around a cutting insert; and said tightening element comprising a tightening element longitudinal axis;
- said tightening element longitudinal axis, when viewed from a side view perpendicular to the length and height of said tool holder, is disposed with respect to the tool holder longitudinal axis at an angle, which angle permits accessibility for loosening and tightening of said tightening element, and thereby to permit replacing cutting inserts in said cutting insert receptacle, in order to provide substantially secure clamping of replacement cutting inserts during operation of a machine tool and thus permit a cutting insert to be replaced in said tool holder without said tool holder being moved in a machine tool in which said tool holder is installed; and
- said angle being less than about forty-five degrees.

2. The tool holder according to claim 1, wherein:
said clamping head comprises:
- a short surface;
- a long surface;
- a first side surface being disposed adjacent said first end of said tool holder length and being disposed adjacent said short surface;
- a second side surface being disposed adjacent said first end of said tool holder length and being disposed adjacent said long surface; and
- a third side surface being disposed adjacent said short surface and being opposite said first side surface; and
said angle permits replacing cutting inserts in said cutting insert receptacle, in order to provide secure clamping of replacement cutting inserts during operation of said machine tool in which access to said first portion and/or side portions, during use, is blocked, such that an adjustment tool for said tightening element is blocked from accessing said tightening element disposed on said first portion and/or side portion, during use, of said tool holder.

3. The tool holder according to claim 2, wherein:
- said tool holder further comprises a connecting body extending away from said first end of said tool holder length and extending away from said clamping head in the direction of the tool holder longitudinal axis and being configured to connect said tool holder to a machine tool;
- said cutting insert receptacle is configured and disposed to accept a cutting insert such that one side of a cutting insert is in contact with said tool holder and the other side of the cutting insert is open to the air;
- said cutting insert receptacle comprises two v-shaped slots, which two v-shaped slots extend in the direction of said tool holder longitudinal axis and are configured and disposed to allow a cutting insert to slide into said cutting insert receptacle upon assembly;
- said cutting insert receptacle further comprises a stop surface being disposed opposite said first end of said tool holder length; said separating slot comprises a first surface and a second surface;
- said first surface and said second surface are substantially parallel;
- said first surface of said separating slot is disposed nearer to said first side surface of said clamping head than said second surface of said separating slot;
- said second surface of said separating slot is disposed nearer to said connecting body than said first surface of said separating slot;
- said separating slot comprises a substantially s-shaped curve in a cross-sectional view, which substantially s-shaped curve comprises:
  - a first slot portion, in which said first surface and said second surface extend from said first end of said tool holder length toward said connecting body and said first surface and said second surface extend substantially parallel to said tool holder longitudinal axis;
  - a second slot portion extending from said first slot portion and curving toward said first portion of said clamping head, in which said first surface curves convexly toward said connecting body and said second surface curves concavely away from said first side surface of said clamping head;
  - a third slot portion extending from said second slot portion, in which said first surface and said second surface are substantially straight; and
  - a fourth slot portion extending from said third slot portion, in which said first surface curves concavely away from said connecting body and said second surface curves convexly toward said first side surface; and
- said tightening element longitudinal axis being substantially perpendicular to said first surface and said second surface of said third slot portion of said separating slot.

4. The tool holder according to claim 3, wherein said angle is less than about thirty degrees.

5. A tool holder of a machine tool configured to permit replacement of cutting inserts in order to provide substantially secure clamping of replacement cutting inserts during operation of a machine tool and in order to permit a cutting insert to be replaced in said tool holder without said tool holder being moved in a machine tool in which said tool holder is installed, said tool holder comprising:
- a length, a height, and a width;
- said tool holder length being greater than either said tool holder height or said tool holder width a tool holder longitudinal axis extending along said tool holder length;

a clamping head being disposed on a first end of said tool holder length and being configured and disposed to accept a cutting insert;

said clamping head comprising a cutting insert receptacle being configured and disposed to accept a cutting insert;

said clamping head comprising a first portion being disposed on a first side of said cutting insert receptacle;

said clamping head comprising a second portion being disposed on a second side of said cutting insert receptacle, which second side is opposite said first side, and said second portion being adjacent said first portion;

a separating slot being disposed between and separating said first portion of said clamping head and said second portion of said clamping head;

a tightening element being configured and disposed to:
 extend between and connect said first portion of said clamping head and said second portion of said clamping head;
 narrow said separating slot by bringing said first portion of said clamping head and said second portion of said clamping head closer together to clamp said clamping head about a cutting insert; and
 expand said separating slot by moving said first portion of said clamping head and said second portion of said clamping head farther apart to loosen said clamping head around a cutting insert; and said tightening element comprising a tightening element longitudinal axis;

said tightening element longitudinal axis being disposed with respect to the tool holder longitudinal axis at an angle, which angle permits accessibility for loosening and tightening of said tightening element, and thereby to permit replacing cutting inserts in said cutting insert receptacle, in order to provide substantially secure clamping of replacement cutting inserts during operation of a machine tool and thus permit a cutting insert to be replaced in said tool holder without said tool holder being moved in a machine tool in which said tool holder is installed; and wherein said angle is less than about forty-five degrees, wherein said first portion of said clamping head comprises a countersunk receptacle for accommodating a head of said tightening element, which countersunk receptacle extends along a center line, the center axis of said tightening element being arranged offset from the center line of said countersunk receptacle in the direction of said second portion of said clamping head.

6. The tool holder according to claim 5, wherein an end face, running next to said cutting insert receptacle is formed by said first side surface and said second side surface.

7. The tool holder according to claim 6, wherein:
said first portion of said clamping head is separated from said connecting body by said separating slot except for a bending cross section; and
said first side surface is in the region of said tightening element and said first side surface is inclined relative to the tool holder longitudinal axis and which extends free of edges up to said separating slot.

8. The tool holder according to claim 7, wherein:
said first portion of said clamping head is separated from said connecting body by said separating slot except for said bending cross section;
said bending cross section lies within said clamping head, the extent of said bending cross section in the direction of the tool holder longitudinal axis being determined by a head region which is raised relative to a top shank surface of said connecting body;
said cutting insert receptacle extends in the direction of said tool holder longitudinal axis beyond said head region; and
said separating slot ends in the raised head region.

9. The tool holder according to claim 1, in combination with a cutting insert being configured to be inserted into and held by said tool holder, said cutting insert being clamped in said cutting insert receptacle.

10. The combination according to claim 9, wherein one of (A), (B), (C), (D), (E), and (F):
(A) said cutting insert is configured to extend along an insert longitudinal axis and has a plate-shaped cutting region having a cutting edge at the front end, and the cutting region widens in the direction of the insert longitudinal axis from a narrow point toward the cutting edge;
(B) said cutting insert is configured to extend along an insert longitudinal axis and has a plate-shaped cutting region having a cutting edge at the front end, and the cutting region widens in the direction of the insert longitudinal axis from a narrow point toward the cutting edge; and
said cutting insert is rotationally symmetrical about 180° relative to a center rotation axis;
(C) said cutting insert is configured to extend along an insert longitudinal axis and has a plate-shaped cutting region having a cutting edge at the front end, and the cutting region widens in the direction of the insert longitudinal axis from a narrow point toward the cutting edge;
said cutting insert is rotationally symmetrical about 180° relative to a center rotation axis; and
said cutting insert comprises a thickened central region, said plate-shaped cutting region adjoining each side of said thickened central region in a diagonally opposite manner;
(D) said cutting insert is configured to extend along an insert longitudinal axis and has a plate-shaped cutting region having a cutting edge at the front end, and the cutting region widens in the direction of the insert longitudinal axis from a narrow point toward the cutting edge;
said cutting insert is rotationally symmetrical about 180° relative to a center rotation axis;
said cutting insert comprises a thickened central region, said plate-shaped cutting region adjoining each side of said thickened central region in a diagonally opposite manner; and
said cutting insert comprises an outer side face of the cutting region which adjoins the central region in an aligned manner, said side face extending up to an outer cutting corner, such that the latter is oriented in alignment with the central region;
(E) said cutting insert is configured to extend along an insert longitudinal axis and has a plate-shaped cutting region having a cutting edge at the front end, and the cutting region widens in the direction of the insert longitudinal axis from a narrow point toward the cutting edge;
said cutting insert is rotationally symmetrical about 180° relative to a center rotation axis;
said cutting insert comprises a thickened central region, said plate-shaped cutting region adjoining each side of said thickened central region in a diagonally opposite manner;

said cutting insert comprises an outer side face of the cutting region which adjoins the central region in an aligned manner, said side face extending up to an outer cutting corner, such that the latter is oriented in alignment with the central region; and the length of the cutting edge defines a grooving width which, starting from the cutting corner, can be set up to a maximum grooving width corresponding to the thickness of the central region; and (F) said cutting insert is configured to extend along an insert longitudinal axis and has a plate-shaped cutting region having a cutting edge at the front end, and the cutting region widens in the direction of the insert longitudinal axis from a narrow point toward the cutting edge;

said cutting insert is rotationally symmetrical about 180° relative to a center rotation axis;

said cutting insert comprises a thickened central region, said plate-shaped cutting region adjoining each side of said thickened central region in a diagonally opposite manner;

said cutting insert comprises an outer side face of the cutting region which adjoins the central region in an aligned manner, said side face extending up to an outer cutting corner, such that the latter is oriented in alignment with the central region;

the length of the cutting edge defines a grooving width which, starting from the cutting corner, can be set up to a maximum grooving width corresponding to the thickness of the central region; and the central region has at the transition to the respective plate-shaped cutting region an end wall inclined relative to the insert longitudinal axis.

11. A cutting insert for use in a tool holder of a machine tool configured to permit replacement of cutting inserts in order to provide substantially secure clamping of replacement cutting inserts during operation of a machine tool and in order to permit a cutting insert to be replaced in said tool holder without said tool holder being moved in a machine tool in which said tool holder is installed, said tool holder comprising:

a length, a height, and a width;

said tool holder length being greater than either said tool holder height or said tool holder width;

a tool holder longitudinal axis extending along said tool holder length;

a clamping head being disposed on a first end of said tool holder length and being configured and disposed to accept a cutting insert;

said clamping head comprising a receptacle being configured and disposed to accept a cutting insert;

said clamping head comprising a first portion being disposed on a first side of said cutting insert receptacle;

said clamping head comprising a second portion being disposed on a second side of said cutting insert receptacle, which second side is opposite said first side, and said second portion being adjacent said first portion;

a separating slot being disposed between and separating said first portion of said clamping head and said second portion of said clamping head;

a tightening element being configured and disposed to:
extend between and connect said first portion of said clamping head and said second portion of said clamping head;
narrow said separating slot by bringing said first portion of said clamping head and said second portion of said clamping head closer together to clamp said clamping head about a cutting insert; and
expand said separating slot by moving said first portion of said clamping head and said second portion of said clamping head farther apart to loosen said clamping head around a cutting insert; and said tightening element comprising a tightening element longitudinal axis;

said tightening element longitudinal axis, when viewed from a side view perpendicular to the length and height of said tool holder, is disposed with respect to the tool holder longitudinal axis at an angle, which angle permits accessibility for loosening and tightening of said tightening element, and thereby to permit replacing cutting inserts in said cutting insert receptacle, in order to provide substantially secure clamping of replacement cutting inserts during operation of a machine tool in which access to said first portion and/or side portions is blocked, such that an adjustment tool for said threaded clamping screw is blocked from accessing a threaded clamping screw disposed on an upper and/or side portion, during use, of a grooving tool tool holder, and thus permit a cutting insert to be replaced in said tool holder without said tool holder being moved in a machine tool in which said tool holder is installed;

said angle being less than forty-five degrees;

said cutting insert being configured to be inserted into and held by said tool holder; and said cutting insert being clamped in said cutting insert receptacle.

12. The cutting insert according to claim 11, wherein one of (A), (B), (C), (D), (E), and (F):

(A) said cutting insert is configured to extend along an insert longitudinal axis and has a plate-shaped cutting region having a cutting edge at the front end, and the cutting region widens in the direction of the insert longitudinal axis from a narrow point toward the cutting edge;

(B) said cutting insert is configured to extend along an insert longitudinal axis and has a plate-shaped cutting region having a cutting edge at the front end, and the cutting region widens in the direction of the insert longitudinal axis from a narrow point toward the cutting edge; and said cutting insert is rotationally symmetrical about 180° relative to a center rotation axis;

(C) said cutting insert is configured to extend along an insert longitudinal axis and has a plate-shaped cutting region having a cutting edge at the front end, and the cutting region widens in the direction of the insert longitudinal axis from a narrow point toward the cutting edge;

said cutting insert is rotationally symmetrical about 180° relative to a center rotation axis; and said cutting insert comprises a thickened central region, said plate-shaped cutting region adjoining each side of said thickened central region in a diagonally opposite manner;

(D) said cutting insert is configured to extend along an insert longitudinal axis and has a plate-shaped cutting region having a cutting edge at the front end, and the cutting region widens in the direction of the insert longitudinal axis from a narrow point toward the cutting edge;

said cutting insert is rotationally symmetrical about 180° relative to a center rotation axis;

said cutting insert comprises a thickened central region, said plate-shaped cutting region adjoining each side of said thickened central region in a diagonally opposite manner; and said cutting insert comprises an outer side face of the cutting region which adjoins the central region in an aligned manner, said side face extending up to an outer cutting corner, such that the latter is oriented in alignment with the central region;

(E) said cutting insert is configured to extend along an insert longitudinal axis and has a plate-shaped cutting region having a cutting edge at the front end, and the cutting region widens in the direction of the insert longitudinal axis from a narrow point toward the cutting edge;

said cutting insert is rotationally symmetrical about 180° relative to a center rotation axis;

said cutting insert comprises a thickened central region, said plate-shaped cutting region adjoining each side of said thickened central region in a diagonally opposite manner;

said cutting insert comprises an outer side face of the cutting region which adjoins the central region in an aligned manner, said side face extending up to an outer cutting corner, such that the latter is oriented in alignment with the central region; and the length of the cutting edge defines a grooving width which, starting from the cutting corner, can be set up to a maximum grooving width corresponding to the thickness of the central region; and (F) said cutting insert is configured to extend along an insert longitudinal axis and has a plate-shaped cutting region having a cutting edge at the front end, and the cutting region widens in the direction of the insert longitudinal axis from a narrow point toward the cutting edge;

said cutting insert is rotationally symmetrical about 180° relative to a center rotation axis;

said cutting insert comprises a thickened central region, said plate-shaped cutting region adjoining each side of said thickened central region in a diagonally opposite manner;

said cutting insert comprises an outer side face of the cutting region which adjoins the central region in an aligned manner, said side face extending up to an outer cutting corner, such that the latter is oriented in alignment with the central region;

the length of the cutting edge defines a grooving width which, starting from the cutting corner, can be set up to a maximum grooving width corresponding to the thickness of the central region; and the central region has at the transition to the respective plate-shaped cutting region an end wall inclined relative to the insert longitudinal axis.

* * * * *